(12) United States Patent
Wang et al.

(10) Patent No.: US 11,180,622 B2
(45) Date of Patent: Nov. 23, 2021

(54) THERMOPLASTIC POLYMER-BASED COMPOSITE MATERIAL AND PREPARATION METHOD THEREOF

(71) Applicants: Changzhou Bamstone Composites Co., Ltd., Changzhou (CN); Wuhan University of Technology, Wuhan (CN)

(72) Inventors: Jun Wang, Wuhan (CN); Junjie Zou, Wuhan (CN); Xiaoli Yang, Wuhan (CN); Wei Liu, Changzhou (CN)

(73) Assignees: CHANGZHOU BAMSTONE COMPOSITES CO., LTD., Changzhou (CN); WUHAN UNIVERSITY OF TECHNOLOGY, Wuhan (CN)

( * ) Notice: Subject to any disclaimer, the term of this patent is extended or adjusted under 35 U.S.C. 154(b) by 46 days.

(21) Appl. No.: 16/645,499

(22) PCT Filed: Nov. 16, 2018

(86) PCT No.: PCT/CN2018/115995
§ 371 (c)(1),
(2) Date: Mar. 9, 2020

(87) PCT Pub. No.: WO2020/093439
PCT Pub. Date: May 14, 2020

(65) Prior Publication Data
US 2021/0221970 A1  Jul. 22, 2021

(30) Foreign Application Priority Data
Nov. 7, 2018  (CN) .......................... 201811322014.X

(51) Int. Cl.
| | | |
|---|---|---|
| *C08J 5/24* | (2006.01) |
| *B32B 27/26* | (2006.01) |
| *B32B 27/38* | (2006.01) |
| *C08G 59/22* | (2006.01) |
| *C08G 59/24* | (2006.01) |
| *C08G 59/30* | (2006.01) |
| *C08G 59/68* | (2006.01) |

(52) U.S. Cl.
CPC ............ *C08J 5/244* (2021.05); *C08G 59/226* (2013.01); *C08G 59/245* (2013.01); *C08G 59/308* (2013.01); *C08G 59/686* (2013.01); *C08G 59/688* (2013.01); *C08J 2363/02* (2013.01)

(58) Field of Classification Search
None
See application file for complete search history.

(56) References Cited

U.S. PATENT DOCUMENTS

| | | | |
|---|---|---|---|
| 2011/0288259 A1* | 11/2011 | Tsujimura | C08G 59/621 528/93 |
| 2017/0247518 A1* | 8/2017 | Tan | C08J 5/24 |
| 2018/0100043 A1* | 4/2018 | Takashima | C08J 5/24 |
| 2018/0346672 A1* | 12/2018 | Eto | B32B 27/38 |

FOREIGN PATENT DOCUMENTS

| | | | | |
|---|---|---|---|---|
| CN | 1775513 | A | 5/2006 | |
| CN | 1844194 | A | 10/2006 | |
| CN | 103740103 | A | 4/2014 | |
| CN | 105906749 | A | 8/2016 | |
| CN | 106117514 | A | 11/2016 | |
| CN | 107353587 | A | 11/2017 | |
| EP | 3385314 | A1 | 10/2018 | |
| WO | WO-9814498 | A1 * | 4/1998 | ............ C08G 59/621 |
| WO | WO-2017094633 | A1 * | 6/2017 | .............. C08L 71/00 |

\* cited by examiner

*Primary Examiner* — Michael J Feely
(74) *Attorney, Agent, or Firm* — Bayramoglu Law Offices LLC

(57) ABSTRACT

A thermoplastic polymer-based composite material and a preparation method thereof are provided. The thermoplastic polymer-based composite material is obtained by impregnating a reinforcing material with a mixture or an oligomer of an epoxy resin, a bisphenol A/F, and a catalyst and then performing an in-situ polymerization. The thermoplastic polymer-based composite material is less expensive to produce, has an optimal impregnation effect, excellent secondary processing performance, high heat resistance, desirable mechanical properties and excellent overall performance.

8 Claims, No Drawings

THERMOPLASTIC POLYMER-BASED COMPOSITE MATERIAL AND PREPARATION METHOD THEREOF

CROSS REFERENCE TO THE RELATED APPLICATIONS

This application is the national phase entry of International Application No. PCT/CN2018/115995, filed on Nov. 16, 2018, which is based upon and claims priority to Chinese Patent Application No. 201811322014.X, filed on Nov. 7, 2018, the entire contents of which are incorporated herein by reference.

TECHNICAL FIELD

The present disclosure relates to a thermoplastic polymer-based composite material and a preparation method thereof, and belongs to the technical field of polymer-based composite materials.

BACKGROUND

Polymer-based composite materials have been widely used in aerospace, marine, automotive and other fields. According to their different resin matrix, the polymer-based composite materials can be divided into thermosetting composite materials and thermoplastic composite materials. In the past half century, thermosetting resin matrix composite materials have been widely recognized by the engineering community as a novel material, and have entered the stage of industrial production with rapid growth at a relatively high rate. However, thermosetting composite materials still have some drawbacks, such as long curing time, high volatile organic compounds (VOC) emissions, low impact resistance, damage resistance, etc. Currently, there is extreme concern about the increasingly serious environmental pollution caused by waste and harmful gases. In developed countries such as European countries and the United States, composite material manufacturers have been required to recycle thermosetting composite material waste and limit the emissions of harmful gases during the molding process of thermosetting composite materials. Thermoplastic composites have attracted widespread attention in the field of composite materials because of their unique advantages such as short molding times, recyclable wastes, and other benefits.

At present, the main manufacturing methods of thermoplastic composite materials are the hot-melt method and the solvent method. The hot-melt method includes melting the thermoplastic resin into a viscous liquid by heating and then impregnating the fibers. However, thermoplastic polymer materials all have relatively high melt viscosity and melting temperature, resulting in certain difficulties in fiber impregnation, processing, and forming of thermoplastic composite materials. The solvent method includes dissolving a resin into a solution with an appropriate solvent and then impregnating the fibers, followed by removing the solvent by heating and evaporation. However, the solvent method has high costs and VOC emissions, and residual solvents will affect the properties of composite materials. Therefore, the preparation of thermoplastic polymer-based composite materials by in-situ polymerization has received increasing attention.

Chinese patent CN200510110969 discloses a method for preparing fiber-reinforced acrylonitrile-butadiene-styrene (ABS) by in-situ polymerization. Chinese patent CN201610382346 discloses a method for preparing fiber-reinforced polyolefin and poly(methyl methacrylate) (PMMA) by in-situ polymerization. Chinese patent CN200610040172 discloses a method for preparing thermoplastic polyurethane (TPU)/a nylon 6 composite material by in-situ polycondensation. In the above-mentioned methods, the thermoplastic composite material is prepared by in-situ polymerization based on existing common thermoplastic matrixes, which can overcome some of the drawbacks of the traditional melting method and solvent method. However, the interface properties of the prepared composite materials have not received much attention.

Chinese patent CN106117514A discloses a thermoplastic composite material and a preparation method thereof. The thermoplastic composite material is prepared by in-situ polymerization after impregnating a fiber with a mixture of a monofunctional primary amine/bifunctional secondary amine and an epoxy resin. Although this method solves the interface problem, the composite material prepared by general epoxy resin has low heat resistance, with a glass transition temperature of 50-65° C., which has a low practical value.

In sum, although the traditional thermosetting composite materials have the advantages of high heat resistance and high strength, they also have the disadvantages of insufficient environmental friendliness, limited production processes, non-recyclability, and other problems. Thermoplastic composites have the advantages of high forming speed, no VOC emissions, environmental friendliness, and good recyclability, but still have disadvantages such as insufficient resin infiltration to fibers, insufficient heat resistance, and other problems. Conventional hot-melt methods for producing thermoplastic composite materials have poor impregnation effect and require a high temperature. The solvent method consumes a large amount of an organic solvent, which is prone to cause environmental pollution. The emerging in-situ polymerization method has drawbacks in terms of interface, raw material selection, and heat resistance. Therefore, there is a need to develop a thermoplastic composite material with excellent overall properties.

SUMMARY

In view of the above-mentioned problems, the present invention provides a thermoplastic polymer-based composite material and a preparation method thereof. The prepared thermoplastic polymer-based composite material has excellent secondary processing performance, relatively high heat resistance and mechanical properties and most of the desirable overall properties.

To achieve the above-mentioned objectives, the following technical solutions are used.

A thermoplastic polymer-based composite material is prepared by an in-situ polymerization reaction after impregnating a reinforcing material with a mixture or an oligomer of an epoxy resin, a bisphenol A/F, and a catalyst; wherein a number of the bisphenol A/F in mole is 0.3-0.6 time a number of epoxy functional groups in mole and a weight percentage of the catalyst in the mixture is 0.1%-5%.

Preferably, the epoxy resin is one or a combination of the following general structural formula:

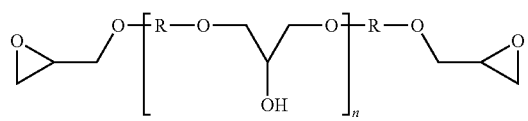

wherein, R is a $C_2$-$C_{18}$ alkyl, an aryl, a cycloalkyl group, a bisphenol A structure, a bisphenol F structure, a bisphenol S structure, a halogenated bisphenol A structure, a halogenated bisphenol F structure, a halogenated bisphenol S structure, a hydrogenated bisphenol A structure, a hydrogenated bisphenol F structure, or a hydrogenated bisphenol S structure; and n is 0-20.

More preferably, the epoxy resin is a bisphenol A epoxy resin.

Preferably, the catalyst is a quaternary ammonium salt, a tertiary phosphine, a quaternary phosphonium salt, or a combination thereof.

Preferably, the reinforcing material includes but is not limited to one or a combination of glass fiber, carbon fiber, aramid fiber, Kevlar fiber, basalt fiber, poly (p-phenylenebenzobisoxazole) (PBO) fiber, nylon fiber, ultra-high molecular weight polyethylene (UHMWPE) fiber, polyimide fiber, and polyester fiber.

A method for preparing the thermoplastic polymer-based composite material, including the following steps:

(1) firstly heating the epoxy resin to 80° C.-150° C., then adding the bisphenol A/F to dissolve, and stirring evenly to obtain a component A for subsequent use;

(2) dispersing the catalyst into the epoxy resin to obtain a component B for subsequent use; and (3) mixing the component A and the component B, then impregnating the reinforcing material rapidly; and after the impregnating is completed, performing an in-situ polymerization to obtain the thermoplastic polymer-based composite material.

Moreover, in steps (1) and (2), distribution ratios of the epoxy resin used in the component A and the component B are controlled to help a device to measure and mix; and a small amount of multifunctional epoxy resin is selectively added to form a branched or lightly crosslinked polymer, and an additional amount is limited for controlling a cross-linking density without reaching a gel point and controlling a polymerization product to be a soluble, fusible thermoplastic polymer.

Preferably, in step (3), a volume ratio of the component A to the component B is 10:1 to 1:1, so as to facilitate the mixing operation.

Preferably, in step (3), a temperature during the impregnating is 80° C.-120° C.

Preferably, in step (3), the in-situ polymerization is performed at a temperature of 80° C.-200° C.

In addition, the thermoplastic polymer-based composite material prepared in step (3) may be subjected to a secondary processing after a secondary heating and softening.

Compared with the prior art, the advantages of the present invention are as follows.

By utilizing the properties of bisphenol A/F to be dissolved in epoxy resin at a certain temperature, an optimally low-viscosity solution is prepared, as a result the solution exhibits superior consistency and covering qualities and can be used for impregnating the reinforcing materials with improved ease. After the impregnating is completed, a linear polymer can be obtained by an in-situ polymerization at a certain temperature.

In the present invention, only inexpensive and readily available raw materials are used and an in-situ polymerization method is employed, and therefore a thermoplastic polymer-based composite material having excellent mechanical properties, heat resistance properties, and interface properties is obtained at a significantly reduced cost financially and to the environment.

DETAILED DESCRIPTION OF THE EMBODIMENTS

To better understand the present invention, the content of the present invention is further illustrated below with reference to the embodiments, understanding that these are only exemplary embodiments of the invention and, therefore, are not to be considered to be limiting of the scope of the invention.

Embodiment 1

1. Preparation of Component A 100 g of bisphenol A epoxy resin (850S, EEW=185-195, purchased from Nantong Xingchen Synthetic Materials Co., Ltd.) is weighed and is heated to 115° C. Then, 80 g of bisphenol A is added, and stirred evenly until the bisphenol A is completely dissolved. The mixture produced is the component A.

The viscosity of the component A at 110° C. is determined to be 150 mPa s

After the component A is kept at 110° C. for 3 days, the viscosity of the component A at 110° C. is determined to be 380 mPa s 2. Preparation of Component B 100 g of bisphenol A epoxy resin (850S, EEW=185-195, purchased from Nantong Xingchen Synthetic Materials Co., Ltd.) is weighed and 4 g methyl triphenyl phosphonium bromide is added to disperse evenly. The obtained mixture is the component B.

The viscosity of the component B at 80° C. is determined to be 220 mPa s

After the component B is kept at 80° C. for 8 days, the viscosity of the component B at 80° C. is determined to be 420 mPa s 3. Mixing of Component A and Component B The components A and B are mixed evenly at a volume ratio of 5:1 to obtain a mixture, and the viscosity of the mixture at 80° C. is determined to be 408 mPa s After performing heat preservation at 80° C. for 1 hour, the viscosity of the mixture at 80° C. is determined to be 1964 mPa s. The heat preservation is continued for 3 hours, and then the temperature is increased to 160° C. and kept for 1 hour. The glass transition temperature (Tg) of the product is determined to be 113° C.

4. Preparation of Thermoplastic Polymer-Based Composite Material

Nine pieces of 15 cm×15 cm glass fiber cloth are cut and spread on the glass plate. The components A and B are mixed at a volume ratio of 5:1 to obtain a mixture and kept the temperature at 80° C. The mixture is evenly coated on the glass fiber cloth with a brush and impregnates the glass fiber cloth. The impregnated glass fiber cloth is placed in an oven at 120° C. for 2 hours to perform in-situ polymerization to obtain 9 pieces of composite prepreg sheets.

The 9 pieces of composite prepreg sheets are stacked together and put into a mold of a hot press. The mold temperature is 160° C. After hot pressing for 5 minutes, the composite prepreg sheets are taken out, and then cooled to obtain a thermoplastic composite laminate.

It can be seen from Embodiment 1 that at a certain temperature, bisphenol A can be fully dissolved in the epoxy resin to form a low-viscosity solution, and the low-viscosity solution has a long storage period at a higher temperature.

After the catalyst is dispersed in the epoxy resin, it can have a long storage period at higher temperatures. After mixing of the components A and B, they can react quickly to form a polymer. The present invention provides a low viscosity intermediary solution with optimal physical properties for effectively impregnating the reinforced material to then yield a thermoplastic polymer-based composite material. The result is obtained without the shortcomings of the prior methods set forth in preceding paragraphs.

Embodiment 2

Conditions are consistent with Embodiment 1 except that the catalyst is changed to be benzyltrimethylammonium chloride, and a thermoplastic composite material laminate similar to that of Embodiment 1 is obtained.

Embodiment 3

Conditions are consistent with Embodiment 1 except that the catalyst is changed to be triphenylphosphine, and a thermoplastic composite material laminate similar to that of Embodiment 1 is obtained.

It can be seen from Embodiments 2 and 3 that by using different catalysts, thermoplastic composite materials similar to that of Embodiment 1 can be obtained.

Embodiment 4

Conditions are consistent with Embodiment 1 except that the bisphenol A epoxy resin is changed to be a bisphenol F epoxy resin (EEW=165-175, purchased from Nantong Xingchen Synthetic Material Co., Ltd.), and the bisphenol A is changed to be a bisphenol F. A thermoplastic composite laminate can also be successfully prepared, but the heat resistance is slightly low with the Tg of 76° C.

It can be seen from Embodiment 4 that by using the bisphenol F and the bisphenol F epoxy resin, a thermoplastic composite material similar to that of Embodiment 1 can also be obtained.

Embodiment 5

Conditions are consistent with Embodiment 1 except that 10% of the bisphenol A epoxy resin is changed to be a phenolic epoxy resin (NPPN-631, EEW=168-178, purchased from Nanya Epoxy Resin (Kunshan) Co., Ltd.). A thermoplastic composite material laminate can also be successfully prepared. The Tg of the product is determined to be 122° C.

The obtained composite material laminate is placed in an oven at 350° C. for half an hour, and it is found that the polymer matrix can be melted.

It can be seen from Embodiment 4 that the composite material obtained by adding a small amount of a multifunctional epoxy resin also has thermoplastic property and the heat resistance is improved.

What is claimed is:

1. A method for preparing a thermoplastic polymer-based composite material, comprising the following steps:
(1) firstly heating a part of an epoxy resin to 80° C.-150° C., then adding a bisphenol A or a bisphenol F to dissolve the part of the epoxy resin heated to obtain a mixed solution, and stirring the mixed solution evenly to obtain a first component for subsequent use;
(2) dispersing a catalyst into the remaining of the epoxy resin to obtain a second component for subsequent use; and
(3) mixing the first component and the second component to obtain a mixture, then impregnating a reinforcing material in the mixture; and after the impregnating is completed to obtain an impregnated reinforcing material, performing an in-situ polymerization on the impregnated reinforcing material to obtain the thermoplastic polymer-based composite material;
wherein a number of the bisphenol A/F in mole is 0.3-0.6 time a number of epoxy functional groups of the epoxy resin in mole, and a weight percentage of the catalyst in the mixture is 0.1%-5%.

2. The method for preparing the thermoplastic polymer-based composite material according to claim 1, wherein in step (3), a volume ratio of the first component to the second component ranges from 10:1 to 1:1.

3. The method for preparing the thermoplastic polymer-based composite material according to claim 1, wherein in step (3), the impregnating is performed at a temperature of 80° C.-120° C.

4. The method for preparing the thermoplastic polymer-based composite material according to claim 1, wherein in step (3), the in-situ polymerization is performed at a temperature of 80° C.-200° C.

5. The method for preparing the thermoplastic polymer-based composite material according to claim 1, wherein the catalyst is at least one selected from the group consisting of a quaternary ammonium salt, a tertiary phosphine, and a quaternary phosphonium salt.

6. The method for preparing the thermoplastic polymer-based composite material according to claim 1, wherein the reinforcing material is at least one selected from the group consisting of glass fiber, carbon fiber, aramid fiber, poly(p-phenylene terephthalamide) fiber, basalt fiber, poly (p-phenylenebenzobisoxazole) (PBO) fiber, nylon fiber, ultra-high molecular weight polyethylene (UHMWPE) fiber, polyimide fiber, and polyester fiber.

7. The method for preparing the thermoplastic polymer-based composite material according to claim 1, wherein a predetermined amount of the epoxy resin is added to form a branched polymer or a lightly crosslinked polymer, and the predetermined amount is determined for controlling a crosslinking density without reaching a gel point and controlling the branched polymer or the lightly crosslinked polymer to be a soluble, fusible thermoplastic polymer.

8. The method for preparing the thermoplastic polymer-based composite material according to claim 1, wherein the epoxy resin has the following general structural formula:

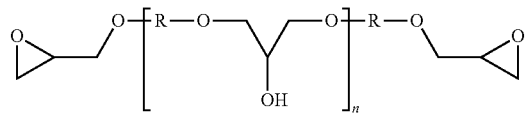

wherein, R is a $C_2$-$C_{18}$ alkyl, an aryl, a cycloalkyl group, a bisphenol A structure, a bisphenol F structure, a bisphenol S structure, a halogenated bisphenol A structure, a halogenated bisphenol F structure, a halogenated bisphenol S structure, a hydrogenated bisphenol A structure, a hydrogenated bisphenol F structure, or a hydrogenated bisphenol S structure; and n is 0-20.

* * * * *